2,993,911
PRODUCTION OF PURE 4,5,6,7,10,10-HEXACHLO-RO-4,7 - ENDOMETHYLENE - 4,7,8,9 - TETRAHY-DROPHTHALANE

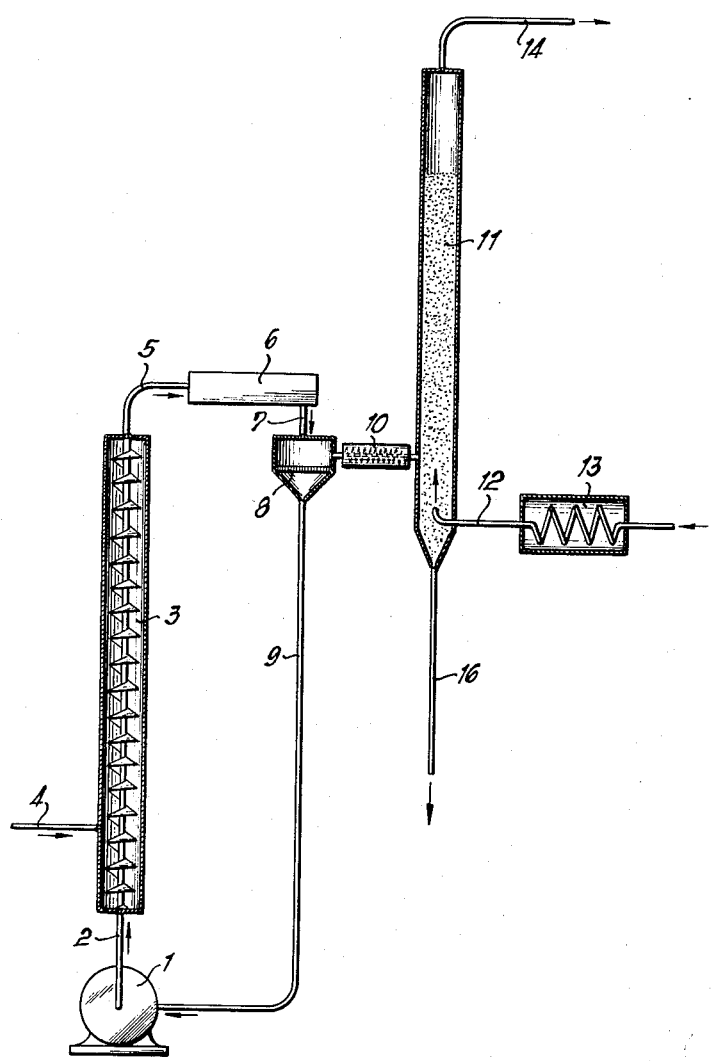

Hans Feichtinger, Dinslaken, Ndrh., and Hans-Werner Linden, Moers, Germany, assignors to Ruhrchemie Aktiengesellschaft, Oberhausen-Holten, Germany, a corporation of Germany
Filed Dec. 26, 1957, Ser. No. 705,232
Claims priority, application Germany Jan. 3, 1957
6 Claims. (Cl. 260—346.2)

This invention relates to new and useful improvements in the production of pure 4,5,6,7,10,10-hexachloro-4,7-endomethylene-4,7,8,9-tetrahydrophthalane.

It is known that 4,5,6,7,10,10-hexachloro-4,7-endomethylene-4,7,8,9-tetrahydrophthalane may be prepared by a Diels-Alder-reaction of 2,5-dihydrofurane and hexachlorocyclopentadiene in accordance with the following reaction:

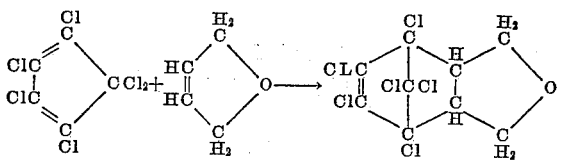

The resulting 4,5,6,7,10,10-hexachloro-4,7-endomethylene-4,7,8,9-tetrahydrophthalane may be further chlorinated particularly in the 1- and 3-position forming the highly effective insecticide 1,3,4,5,6,7,10,10-octachloro-4,7-endomethylene-4,7,8,9-tetrahydrophthalane.

The conventional method for the production of 4,5,6,7,10,10-hexachloro-4,7-endomethylene-4,7,8,9-tetrahydrophthalane, however, is only suitable for batch operation and the reaction product obtained must be further purified prior to the subsequent processing, as for example, the chlorination.

A continuous process has been proposed for the production of the 4,5,6,7,10,10-hexachloro-4,7-endomethylene-4,7,8,9-tetrahydrophthalane. In accordance with this process, hexachlorocyclopentadiene and 2,5-dihydrofurane admixed with a solvent boiling between about 200–300° C. are continuously passed at normal pressure through a heated multi-part tubular system and the reaction product formed is subsequently isolated by distillation and crystallization.

This continuous process, however, has the disadvantages of a low space-time yield due to the solvent and the requirement of a cumbersome purification method for the resultant products by solvent vapor distillation under vacuum followed by crystallization. Furthermore, the 4,5,6,7,10,10-hexachloro - 4,7 - endomethylene-4,7,8,9-tetrahydrophthalane obtained in this manner is not pure enough to be directly chlorinated and the same must be recrystallized after the separation from the solvent, particularly if an aliphatic hydrocarbon is used as the solvent. If this further purification by recrystallization is not effected, the introduction of the chlorine in the 1- and 3-position may be inhibited.

One object of this invention is a continuous process for the production of 4,5,6,7,10,10-hexachloro-4,7-endomethylene-4,7,8,9-tetrahydrophthalane without the above-mentioned difficulties. This, and still further objects will become apparent from the following description read in conjunction with the drawing which diagrammatically shows an embodiment of an arrangement for effecting the process in accordance with the invention in the form of a flow sheet.

In accordance with the invention, 2,5-dihydrofurane is contacted with an excess of hexachlorocyclopentadiene in the absence of any additional diluting agent at an elevated temperature. The resulting 4,5,6,7,10,10-hexachloro-4,7-endomethylene-4,7,8,9-tetrahydrophthalane is separated, preferably by cooling to a temperature sufficiently low to cause crystallization and the crystals are separated from the mother liquid, as, for example, by filtration. The 4,5,6,7,10,10-hexachloro-4,7-endomethylene-4,7,8,9-tetrahydrophthalane separated in this manner, is then fluidized in a heated inert gas stream to thereby remove adhering hexachlorocyclopentadiene and the pure 4,5,6,7,10,10-hexachloro - 4,7 - endomethylene-4,7,8,9-tetrahydrophthalane is recovered.

The contacting of the 2,5-dihydrofurane with the hexachlorocyclopentadiene is preferably effected in a single vertically extending elongated reaction zone which may advantageously contain inserts, as for example, a helix, filling bodies or the like. The 2,5-dihydrofurane and the excess hexachlorocyclopentadiene are preferably passed upwardly through this reaction zone at a temperature ranging between 160° C. and 200° C., preferably at a temperature of about 180° C., and preferably at normal atmospheric pressure. The mol ratio of 2,5-dihydrofurane to the hexachlorocyclopentadiene should be between 1:2 and 1:10 and should preferably be between 1:2.5 and 1:4. The 2,5-dihydrofurane or a mixture of 2,5-dihydrofurane and hexachlorocyclopentadiene is preferably injected into the pure hexachlorocyclopentadiene in the lower fourth of the reaction zone, as for example, through nozzles.

Due to the direct interaction of the reactants, the residence time in the reaction zone is relatively short, ranging between 45 and 90 minutes. If the process is operated at the optimum temperature of about 180° C., an almost quantitative conversion to the 4,5,6,7,10,10-hexachloro - 4,7 - endomethylene-4,7,8,9-tetrahydrophthalane takes place. The hexachlorocyclopentadiene used in excess may be recycled to the process after removal of the adduct.

When operating in accordance with the invention, the adduct is formed at a sufficient rate so that the partial pressure of the 2,5-dihydrofurane always remains below atmospheric pressure, thus permitting operation at normal atmospheric pressure.

Due to the high rate of conversion, it is possible to dispense with the multi-tube system which is used in the solvent process, and as has been mentioned it is advantageous to operate with a single vertical reaction vessel.

If desired, the hexachlorocyclopentadiene passed to the process, may be preheated to the reaction temperature desired, with, for example, the use of heat exchangers.

After passage through the reaction zone, the reactants are cooled to a temperature sufficiently low to cause crystallization of the 4,5,6,7,10,10-hexachloro-4,7-endomethylene-4,7,8,9-tetrahydrophthalane. The thus crystallized 4,5,6,7,10,10 - hexachloro - 4,7-endomethylene - 4,7,8,9-tetrahydrophthalane is then separated from the mother liquid which consists almost exclusively of hexachlorocyclopentadiene, as for example, by filtration. The separated 4,5,6,7,10,10 - hexachloro - 4,7-endomethylene - 4,7,8,9-tetrahydrophthalane is then fluidized in, for example, a conventional fluidization chamber with the fluidization chamber with the fluidization being effected by a preheated stream of inert gas, as for example, nitrogen, at a temperature of from about 130 to 160° C. The fluidization is effected in the conventional and well known manner, using conventional fluidization gas flow rates, and is preferably effected in a heat insulated fluidization chamber.

The 4,5,6,7,10,10 - hexachloro - 4,7 - endomethylene-4,7,8,9-tetrahydrophthalane obtained, in accordance with the invention, is particularly well suited for the fluidization treatment, as the same is in the form of very fine crystals, which, due to the high melting point thereof of 240° C., retain their crystalline form during the drying and will not cake together. The fluidization effectively removes the hexachlorocyclopentadiene adhering to the crystals and the hexachlorocyclopentadiene carried off with the fluidization gas stream may be recovered, if desired, as for example, by condensation or the use of absorption devices.

Referring to the embodiment shown in the drawing, recycled hexachlorocyclopentadiene is introduced into the lower end of the reaction tube 3 by means of the pump 1 in the line 2. The vertical reaction tube 3 as shown contains a spiral shaped insert, though the same may contain inserts in other forms, as for example, filling bodies such as Raschig rings. The quantity required of pure dry 2,5-dihydrofurane or a mixture of hexachlorocyclopentadiene and 2,5-dihydrofurane is admitted through the line 4. If, as shown, no separate provision is made for additional introduction of hexachlorocyclopentadiene, the mixture of the 2,5-dihydrofurane and hexachlorocyclopentadiene is admitted through the line 4. The reactants are passed upwardly through the tube 3 at a flow rate, so that the residence time in the tube is between about 45 and 90 minutes, while the tube is externally heated, as for example, electrically, in order to maintain the temperature of the reactants at about 180° C. After passage through the tube 3 into the line 5, the 2,5-dihydrofurane has almost been quantitatively converted into 4,5,6,7,10,-10 - hexachloro - 4,7 - endomethylene - 4,7,8,9 - tetrahydrophthalane, so that the effluent reaction mixture consists almost exclusively of 4,5,6,10,10-hexachloro-4,7-endomethylene-4,7,8,9-tetrahydrophthalane and hexachlorocyclopentadiene. The 4,5,6,7,10,10-hexachloro-4,7-endomethylene-4,7,8,9-tetrahydrophthalane is then crystallized in the cooler 6, which, for example, is externally cooled and for example, with water or another cooling medium and which is preferably provided with a conveying and scraping device such as a screw conveyor. At the end of the cooler 6, the reaction product is passed through the line 7 to the filtering device 8, where the 4,5,6,7,10,10-hexachloro-4,7-endomethylene-4,7,8,9 - tetrahydrophthalane is separated from the hexachlorocyclopentadiene and the excess hexachlorocyclopentadiene is recycled to the process through the line 9.

By means of a conveying device 10 which, for example, consists of a closed screw conveyor, the solid constituents separated on the filter are passed into the fluidization chamber 11, which has conventional construction, and which is preferably insulated. Nitrogen and another inert gas which has been heated, for example, to a temperature of 130 to 160° C., in the heater 13, is injected through the line 12 at the bottom of the fluidization chamber 11 at a fluidization velocity so that the 4,5,6,7,10,10-hexachloro - 4,7 - endomethylene - 4,7,8,9 - tetrahydrophthalane crystals are fluidized and the coherent hexachlorocyclopentadiene is removed from their surface and carried off with the effluent gas stream, leaving the fluidization chamber at 14. The gas stream leaving 14 may be freed from any entrained solid particles in a dust collector, as for example, in a cyclone separator and if desired, the hexchlorocyclopentadiene may also be separated, as for example, by condensation or absorption.

The fluidization in the chamber 11 should be so effected that the fluidized bed which forms does not extend to the upper edge of the fluidization chamber until the adhering hexachlorocyclopentadiene is practically completely removed.

The dried reaction product which is practically completely freed from the hexachlorocyclopentadiene may be withdrawn at the bottom of the fluidization chamber 11 through a line 15, after having shut off the inert gas stream used for the fluidization.

The product obtained consists of a white crystalline powder which may be used for chlorination or for other organic synthesis without any further after-treatment or purification as the content of the hexachlorocyclopentadiene is between 0.5 and 2% or below. In contrast to this, when operating with the known solvent process, coarse crystals of the light grey dark color are obtained, which can only be chlorinated with a great excess of chlorine to form the desired 1,3,4,5,6,7,10,10-octachloro-4,7 - endomethylene - 4,7,8,9 - tetrahydrophthalane, whereas the product, in accordance with the invention may be quantitatively chlorinated to this product.

Furthermore, as compared to the conventional solvent process, the process in accordance with the invention allows a substantially increased space-time yield and a simple separation of the adduct obtained while, of course, avoiding the additional expense of the solvents and their recovery. By operating without solvents in accordance with the invention, the formation of by-products and impurities, as for example, undesirable condensation compounds, polymers and resins is largely suppressed.

The fact that when operating in accordance with the invention the 4,5,6,7,10,10-hexachloro-4,7-endomethylene-4,7,8,9-tetrahydrophthalane does not need to be purified by a cumbersome solvent distillation under vacuum or by recrystallization offers a substantial saving and advantage.

The following examples are given by way of illustration and not limitation:

*Example 1*

A quartz tube 3 of 25 mm. inside diameter and 2 meters in length which was electrically heated and provided with a glass spiral, two charging devices and a discharging device was filled with hexachlorocyclopentadiene. After heating of the contents of the tube to 180° C., 600 grams/hr. of hexachlorocyclopentadiene, were introduced into the tube 3 by means of pump 1. In addition, 102 grams/hr. of dry 2,5-dihydrofurane were introduced through the line 4. The mol ratio of the total hexachlorocyclopentadiene to the added 2,5-dihydrofurane was about 2.5:1. The maximum residence time of the reaction mixture in the reactor 3 was 90 minutes. Thereafter, the reaction mixture was passed through the externally cooled crystallizer 6 where a fine-grained 4,5,6,7,10,10 - hexachloro - 4,7-endomethylene-4,7,8,9-tetrahydrophthalane separated. After a retention time of 1 hour, the mother liquor and the crystallizate were passed to the separator 8 where 475 grams/hr. of 4,5,6,7,10,10-hexachloro - 4,7-endomethylene-4,7,8,9-tetrahydrophthalane contain up to 2% by weight of adhering hexachlorocyclopentadiene were obtained. This corresponded to 95% of the theoretically possible amount, based on 2,5-dihydrofurane charged.

The addition product was then transferred into the fluidization chamber 11 where the hexachlorocyclopentadiene was removed with a nitrogen stream preheated to 150 to 160° C. in the preheater 13. The 4,5,6,7,10,10-hexachloro - 4,7-endomethylene-4,7,8,9-tetrahydrophthalane obtained after this treatment had a melting point of 238 to 240° C. and was of white, finely grained form. According to analyses, the compound had a content of hexachlorocyclopentadiene of only 0.1 to 0.2% by weight. By chlorination in carbon tetrachloride with gaseous chlorine and with irradiation by means of ultraviolet light (for example, with a Hanau quartz lamp), the product could be quantitatively converted into 1,3,4,5,6,7,10,10-octachloro-4,7-methylene-4,7,8,9-tetrahydrophthalane.

*Example 2*

In the manner and under the reaction conditions as described in Example 1, the reaction tube 3 was charged with 1200 grams/hr. of hexachlorocyclopentadiene introduced through line 2 and with a mixture of 400 grams/hr. of hexachlorocyclopentadiene and 102 grams./hr. of dry 2,5-dihydrofurane introduced through line 4. In doing so, a molar ratio of hexachloro-cyclopentadiene to 2,5-dihydrofurane of 4:1 and a residence time of about 50 minutes were maintained. In the filter device 8, 456 grams/hr. of 4,5,6,7,10,10-hexachloro-4,7,8,9-tetrahydrophthalane were obtained. This corresponded to 91% of the theoretically possible amount, based on 2,5-dihydrofurane charged.

While the invention has been described with reference to certain specific embodiments, various changes and modifications will become apparent to the artisan and fall within the spirit of the invention and scope of the appended claims.

We claim:

1. In the process for the production of 4,5,6,7,10,10-hexachloro - 4,7 - endomethylene - 4,7,8,9 - tetrahydrophthalane by reaction of 2,5-dihydrofurane with hexachlorocyclopentadiene at 160°–200° C., the improvement which comprises contacting said dihydrofurane with an excess of hexachlorocyclopentadiene, in the absence of additional diluents, cooling the reaction mixture to cause precipitation of the said 4,5,6,7,10,10-hexachloro-4,7-endomethylene-4,7,8,9-tetrahydrophthalane, separating said product from the mother liquid, fluidizing said 4,5,6,7,10,10 - hexachloro - 4,7 - endomethylene - 4,7,8,9 - tetrahydrophthalane with a stream of preheated inert gas to thereby remove the adhering excess hexachlorocyclopentadiene and recovering the pure 4,5,6,7,10,10-hexachloro-4,7-endomethylene-4,7,8,9-tetrahydrophthalane formed.

2. Process according to claim 1, in which said contacting is effected at a temperature of about 180° C.

3. Process according to claim 1, in which said 2,5-dihydrofurane and hexachlorocyclopentadiene are contacted in a mol ratio of between about 1:2 and 1:10.

4. Process according to claim 3, in which the 2,5-dihydrofurane and hexachlorocyclopentadiene are contacted in a mol ratio of between about 1:2.5 and 1:4.

5. Process according to claim 1, in which the separated 4,5,6,7,10,10 - hexachloro - 4,7 - endomethylene - 4,7,8,9-tetrahydrophthalane is fluidized in a nitrogen gas stream, at a temperature between about 130–160° C.

6. Process according to claim 1, in which the 4,5,6,7,10,10 - hexachloro - 4,7 - endomethylene - 4,7,8,9-tetrahydrophthalane precipitate is separated from the mother liquid by filtration.

References Cited in the file of this patent

FOREIGN PATENTS

| R 16,980 | Germany | Sept. 20, 1956 |
| 83,106 | Netherlands | Oct. 15, 1956 |
| 772,212 | Great Britain | Apr. 10, 1957 |

OTHER REFERENCES

Weissberger: Techniques of Org. Chem., vol. IV, p. 17 (1951).

UNITED STATES PATENT OFFICE
CERTIFICATE OF CORRECTION

Patent No. 2,993,911

July 25, 1961

Hans Feichtinger et al.

It is hereby certified that error appears in the above numbered patent requiring correction and that the said Letters Patent should read as corrected below.

Column 2, lines 59 and 60, strike out "fluidization chamber with the"; column 3, line 29, for "4,5,6,10,10-" read -- 4,5,6,7,10,10- --; line 58, for "hexchlorocyclopentadiene" read -- hexachlorocyclopentadiene --; column 4, line 46, for "contain" read -- containing --.

Signed and sealed this 5th day of December 1961.

(SEAL)
Attest:

ERNEST W. SWIDER
Attesting Officer

DAVID L. LADD
Commissioner of Patents

USCOMM-DC